Patented Dec. 1, 1942

2,303,835

UNITED STATES PATENT OFFICE 2,303,835

METHOD OF SWEETENING SOUR PETROLEUM DISTILLATES

Roy L. Gholson, McLean, Tex.

No Drawing. Application May 9, 1939,
Serial No. 272,697

1 Claim. (Cl. 196—28)

The object of this invention is to provide a process of oxidizing the mercaptans in natural gas or light petroleum fractions, either in the liquid or vapor phase, into corresponding di-sulphides, and thus make them sweet to the standard "doctor test" and also transforming the mercaptans so that they will have a pleasing odor.

This process should not be confused with processes now in use, wherein solutions of salts, and other chemicals are reacted to sweeten the petroleum fractions. Neither does this process desulphurize the petroleum fractions, but merely converts the mercaptans or thio alcohols in petroleum fractions into di-sulphides.

The chemicals used in this process are dry and are not dissociated into ions. The chemicals must also be maintained at a temperature of 140° F. thereabouts to cause the oxygen of the air to effect the conversion.

The sweetening process is that of bringing the petroleum fractions and atmospheric oxygen in contact with the catalyst herein described, for converting them from mercaptans to di-sulphides.

DESCRIPTION AND COMPOSITION OF CATALYST

The catalyst is prepared by mixing ferric sulphate $Fe_2(SO_4)_3$ and sodium chloride NaCl, in water solution in molecular quantities to have the following equilibrium equation:

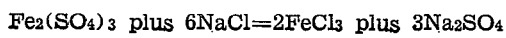

$Fe_2(SO_4)_3$ plus $6NaCl = 2FeCl_3$ plus $3Na_2SO_4$

This liquid solution is impregnated in a porous material as fuller's earth, activated charcoal, asbestos fibre and dried. The drying operation is very important as the chemicals are inactive towards having any catalytic value if the absorbent contains water. The material should be rather dusty before introduction into the reaction chamber.

Special note should be taken here that the water used in mixing the chemicals for the equilibrium solution is removed after the chemicals are impregnated in the absorbent. There is of necessity an amount of water that is held in crystallization in the molecules themselves that is necessary for this process to function. A liquid solution phase is not maintained and a temperature of 140° F. thereabouts is necessary to be maintained for practical results.

Laboratory experiments have proven that the catalyst herein described produces a "doctor sweet" non-corrosive and pleasant odored product from the very sour petroleum products of the West Texas oil fields.

A pilot plant was maintained in operation for a period of over 60 days treating very sour natural gasoline. The chemicals in the catalyst apparently remained unchanged and maintained their original effectiveness.

It is absolutely necessary that the hydrogen sulphide in the petroleum products treated by this process be removed before the conversion of the mercaptans or thio alcohols into di-sulphides is attempted.

The following proportions are used:
Equilibrium equation:

$Fe_2(SO_4)_3$ plus $6NaCl = 2FeCl_3$ plus $3Na_2SO_4$
133.3 grams of ferric sulphate, $Fe_2(SO_4)_3$
116.7 grams of sodium chloride, NaCl
1000 cc. water more or less, depending on porosity of the absorbent used.

This equilibrium solution is impregnated in the absorbent and allowed to dry thoroughly preferably at from above 100° F. to 180° F.

OXIDATION OR SWEETENING PROCESS

Oxidation of mercaptans to Corresponding di-sulphides

Theory

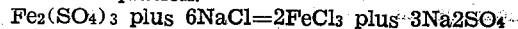

$FeCl_3$ plus $3H$—$S$—$R$ ⟶ $3HCl$ plus $Fe\begin{smallmatrix}S\\ \diagup\\ \diagdown\\ SR\end{smallmatrix}R$
(Mercaptan)                           (Iron mercaptide)

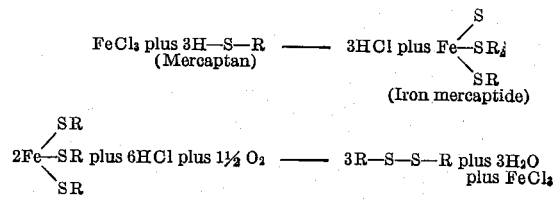

$2Fe\begin{smallmatrix}SR\\ \diagup\\ \diagdown\\ SR\end{smallmatrix}$ plus $6HCl$ plus $1\frac{1}{2} O_2$ ⟶ $3R$—$S$—$S$—$R$ plus $3H_2O$ plus $FeCl_3$ The above chemical reactions are given here for the purpose of picturing what might be happening during the sweetening process. In all probability there can be no dissociation of the salts into so called ions as the reactions take place in the absence of a liquid solution phase.

It is a known fact that water is a by-product of the reaction and if the water is allowed to collect in the porous absorbent, the iron and sodium salts become inactive. It is to be made clear at this point that the temperature of 140° F. thereabouts is for the purpose of maintaining the chemicals free from any possibility of an aqueous solution phase.

From a theoretical standpoint a better understanding of the chemistry of the process will be obtained from considering the following reaction:

Let the symbols H—S—R represent the mercaptan or sulphur bearing hydrocarbon.

H represents a hydrogen atom and the S—R represents a sulphur atom and an alkyl radical.

R—S—H plus O plus H—S—R = R—S—S—R plus $H_2O$

In other words the oxygen which is in the air present in the reaction chamber takes up the hydrogen molecules from the two mercaptans thus uniting them to form the di-sulphide and water as a by-product.

The oxygen is the sweetening agent, or reactant, or reagent. The ferric salts and sodium salts seem to be carriers only, causing the admixture of mercaptans and oxygen to unite and at the same time converting them into corresponding disulphides. It would appear that the process is catalytic in its nature, as it does not act as a reagent as described in processes now in use where it is necessary to have aqueous solutions.

The following observations were noted in the research during the development of this process. The process has also been found to be commercially practical from pilot plant operation.

a. The oxidation proceeds nicely and goes to complete conversion when proper concentrations of gaseous oxygen is maintained.

b. The contact mass must be kept dry. At temperatures above 212° F. the water of crystallization is lost the catalyst will cease to function.

c. 140° F. thereabouts is imperative for practical results.

d. This process is different than processes in which copper sulphate is used in aqueous solution phase because the ferric salt will not bring about the conversion or sweetening action on mercaptans when it is ionized in water or aqueous solution.

e. The petroleum products treated by this process may be in gas, liquid, or vapor phase. When in the gas or vapor phase and at temperatures above 200° F. it is necessary to have an admixture of steam.

What is claimed is:

A method of sweetening sour petroleum distillates, comprising the following steps; providing a catalyst by admixing, ferric sulphate salt and sodium chloride in equilibrium solution with air, saturating an absorbent body of granular nature with the catalyst, subjecting the absorbent mass treated with the catalyst to the action of hot air at a temperature of 140° F., removing the moisture from the absorbent mass, and finally passing the distillates under treatment through the porous mass so treated.

ROY L. GHOLSON.